US008619402B2

(12) United States Patent
Whitby-Strevens (10) Patent No.: US 8,619,402 B2
(45) Date of Patent: Dec. 31, 2013

(54) DATA PORT TRANSIENT PROTECTION APPARATUS AND METHODS (75) Inventor: Colin Whitby-Strevens, Ben Lomond, CA (US)

(73) Assignee: Apple Inc., Cupertino, CA (US)

( * ) Notice: Subject to any disclaimer, the term of this patent is extended or adjusted under 35 U.S.C. 154(b) by 33 days.

(21) Appl. No.: 13/372,298

(22) Filed: Feb. 13, 2012

(65) Prior Publication Data
US 2012/0212867 A1 Aug. 23, 2012

Related U.S. Application Data (63) Continuation of application No. 12/005,020, filed on Dec. 21, 2007, now Pat. No. 8,116,057.

(60) Provisional application No. 60/876,723, filed on Dec. 21, 2006.

(51) Int. Cl.
H01L 7/12 (2006.01)
H02H 1/00 (2006.01)
H02H 1/04 (2006.01)
H02H 3/22 (2006.01)
H02H 9/06 (2006.01)

(52) U.S. Cl.
USPC .......................................... 361/119; 361/111

(58) Field of Classification Search
USPC ......................................................... 361/119
See application file for complete search history.

(56) References Cited

U.S. PATENT DOCUMENTS

| 5,077,675 | A |   | 12/1991 | Tam |  |
|---|---|---|---|---|---|
| 5,079,455 | A |   | 1/1992 | McCafferty et al. |  |
| 5,428,523 | A |   | 6/1995 | McDonnal |  |
| 5,550,699 | A |   | 8/1996 | Diaz |  |
| 5,572,395 | A |   | 11/1996 | Rasums et al. |  |
| 5,944,827 | A |   | 8/1999 | Shima et al. |  |
| 5,990,786 | A | * | 11/1999 | Issa et al. | 340/429 |
| 6,333,643 | B1 |   | 12/2001 | Kurooka et al. |  |
| 6,639,198 | B2 | * | 10/2003 | Riess et al. | 219/660 |
| 7,130,175 | B2 |   | 10/2006 | Dietz et al. |  |
| 7,706,112 | B2 |   | 4/2010 | Crawley et al. |  |

* cited by examiner

Primary Examiner — Dharti Patel
(74) Attorney, Agent, or Firm — Womble Carlyle Sandridge & Rice LLP (57) ABSTRACT Methods and apparatus for protecting data bus ports and their corresponding PHY devices from taking damage associated with excess voltage across one or more signal pairs during an intermittent connection are provided. Such connections cause the signal pins to carry external device current which raises the signal voltage above the power rails, exceeding the PHY device ratings and causing PHY degradation or destruction. In an exemplary embodiment, an RC circuit is used to detect the voltage level across a signal pair. If this voltage level exceeds a certain preset voltage level, power to the outgoing serial bus port is shut off and return power is abated. While the circuit is responding, the exemplary embodiment uses a 3.6V Zener diode to bleed excess voltage to ground. A current monitor/limiter is also used for limiting current if the voltage level detected exceeds a certain threshold.

31 Claims, 8 Drawing Sheets

DATA PORT TRANSIENT PROTECTION APPARATUS AND METHODS

PRIORITY

This application is a continuation of and claims priority to co-owned, U.S. patent application Ser. No. 12/005,020 filed Dec. 21, 2007 and entitled "DATA PORT TRANSIENT PROTECTION APPARATUS AND METHODS", which claims priority to U.S. provisional patent application Ser. No. 60/876,723 filed Dec. 21, 2006 entitled "DATA PORT TRANSIENT PROTECTION APPARATUS AND METHODS", each incorporated herein by reference in its entirety.

BACKGROUND OF THE INVENTION

1. Field of Invention

The present invention relates generally to the field of data networking and electronic component interface. More particularly, the present invention is directed in one exemplary aspect to protecting serial bus ports from transient damage.

2. Description of Related Technology

A number of different data bus and port technologies are known in the prior art. These include, for example, the well known USB (universal serial bus) and IEEE-Std-1394 or "Firewire", as well as peripheral component interface (PCI) and RS-232, which may be used in electronic devices such as personal computers, consumer goods (e.g., DSTBs, cameras, printers), and the like.

The interconnection of one device to another via a data port can produce certain undesired side-effects. For example, when serial bus interface devices are "hot" plugged (or unplugged) to a serial bus port, the serial bus transceiver (e.g., PHY) may be damaged when high-current external devices are used. This is because an intermittent connection on the DC power return connection causes the signal pins to carry the external device current, which raises the signal voltage above that of the power rails, exceeding the PHY device ratings and causing PHY degradation or destruction. In this exemplary context, the presence of excessive voltage on the signal pins due to intermittent connection on the DC power return is often referred to as a "late-VG" event.

One current approach to transient protection employs a Zener diode to protect against late-VG events by bleeding excessive voltages on the signal pairs to ground. With a suitable choice of diode, based at a suitable level, this approach reduces the incidence of failures seen in the field by a significant amount (typically on the order of 50%). However, highly stressful late-VG events cause failure of either the Zener diode or the PHY chip (or both). Typically, the Zener fails "shorted" or in a low resistance state, effectively shorting the signal rails to ground and preventing proper serial bus operation.

One approach to addressing the foregoing issue involves using a circuit to detect a high return voltage on the signal pairs by comparing this voltage with a preset voltage level. The circuit responds to this condition by turning off the outgoing port power.

However, the aforementioned approach has a variety of shortcomings. First, the response time of the circuit is often far too slow; damage may well be caused before the port power is turned off and consequently return power is abated.

Second, the Zener diode commonly used in this circuit has also proved in practice to be susceptible to the same failure cause.

Third, once the power is turned off, the circuit fails to turn power back on after an intended (e.g., half-second) delay.

Fourth, even with a sufficiently fast circuit response time, a comparatively high voltage can be seen in the case of shorts or near-shorts between outgoing power terminals and the signal pairs.

Prior art circuitry and methods only loosely concern themselves with these issues. For example, U.S. Pat. No. 5,077,675 to Tam issued Dec. 31, 1991 entitled "Power-on-concurrent maintenance" discloses a power sequencer for connecting a system to an electrical power supply without powering down the system and without damage to the system or the power supply. A plurality of sequentially engageable contacts are coupled to the power supply for receiving power signals. The contacts are spatially positioned to toggle in a predetermined sequence during engagement. A controller is coupled to the contacts, for supplying a terminal signal to the load in response to the predetermined sequence of toggling of the contacts and in response to the power signals. The controller has a control circuit for generating a control signal which varies in response to the sequence, and a regulator, coupled to the control circuit, for regulating the terminal signal in response to the control signal.

U.S. Pat. No. 5,079,455 to McCafferty, et al. issued Jan. 7, 1992 entitled "Surge current-limiting circuit for a large-capacitance load" discloses a circuit for limiting switch-on surge current to a load including a large capacitance includes a MOSFET whose controlled path is connected in series with the capacitance across power supply terminals. A resistor and a capacitor, having a relatively small capacitance, are also connected in series with the controlled path, and a junction between the resistor and capacitor is connected to a gate of the MOSFET via a further resistor to provide a negative feedback path for charging the load capacitance with a constant current when power is applied. A further capacitor prevents initial turn-on of the MOSFET, and a Zener diode limits the gate voltage. An alternative arrangement using a differential amplifier is described. The resistive part of the load can be connected in parallel with the load capacitance, or to the power supply terminals for which it can be separately switched in dependence upon the gate voltage.

U.S. Pat. No. 5,428,523 to McDonnal issued Jun. 27, 1995 entitled "Current sharing signal coupling/decoupling circuit for power converter systems" discloses an improved current sharing signal coupling/decoupling circuit for power converter systems, including the provision of an individual current sharing signal coupling/decoupling circuit for each module of a number of parallel connected modules, each circuit providing an interface between a module's "current sharing signal" port and a common connection bus. The signal coupling/decoupling circuits also share a common ground noted in the disclosure as "current sharing signal ground". The signal coupling/decoupling circuit includes a comparator, a bi-directional switch and a variable voltage reference. The comparator senses the difference between the voltage on the common connection bus, the "common current sharing signal," less an amount set by the variable voltage reference circuit, and the voltage on the module current sharing signal port, the "module current sharing signal". If the module current sharing signal drops below the common current sharing signal, the comparator activates the bi-directional switch, disconnecting the module current sharing signal port from the common connection bus, allowing the remaining parallel connected modules to continue normal operation, thus providing a system that is tolerant of individual module faults.

U.S. Pat. No. 5,550,699 to Diaz issued Aug. 27, 1996 entitled "Hot plug tolerant ESD protection for an IC" discloses a bi-modal trigger circuit for ESD protection in an IC that is arranged to use the energy of the ESD event itself to trigger an SCR when VDD is absent and energy from VDD when VDD is present. This is accomplished by top and bottom inverters in series, and a trigger FET whose conduction triggers an SCR, and whose gate is driven by the voltage across the bottom inverter. The trigger threshold of the bi-modal trigger circuit may be raised above VDD when VDD is absent by the inclusion of a constant voltage drop inserted between the series connected top and bottom inverters that comprise the bi-modal trigger. This provides an offset voltage that must be overcome before a trigger FET can turn on and fire an SCR that does the actual ESD protection. The constant voltage drop may be produced by a series string of diode connected FET's. The threshold may also be increased by including a latch-connected feedback FET that shunts the gate of the trigger FET, thereby retarding the turn-on of the trigger FET until saturation in the feedback FET trips the latch. These two techniques can be used separately or in combination. When used in combination the number of diode connected FET's may be reduced to provide a constant voltage drop that is substantially less than the desired increase in the trigger voltage for the bi-modal trigger circuit.

U.S. Pat. No. 5,572,395 to Rasums, et al. issued Nov. 5, 1996 entitled "Circuit for controlling current in an adapter card" discloses a circuit embodied within an adapter card for hot-plugging with a card slot in a card slot coupled to a processor based system utilizes a biasing circuit for ensuring that the input voltage to the load of the adapter card is of a sufficient magnitude. The circuit also includes a FET/feedback circuit for opening and closing the circuit provided between the input voltage to the adapter card and the load. This FET/feedback circuit operates as a constant current source to charge the input capacitance of the load and converts to a switched mode when the load capacitance is fully charged. The biasing circuit controls the FET/feedback circuit so that it remains open during hot-plugging of the adapter card into the card slot to alleviate pin arching. A monitor/timer circuit prevents the FET/feedback circuit from operating in the constant-current mode for no longer than a predetermined amount of time. A latch circuit is provided to turn off the FET within the FET/feedback circuit upon sensing of a transient current through the load.

U.S. Pat. No. 5,944,827 to Shima et al. issued Aug. 31, 1999 entitled, "Power saving control system and method for use with serially connected electronic devices" discloses a system including a plurality of electronic devices connected together through a bus, which can realize reduction in power consumption while ensuring communications. When a bias voltage on an external bus is detected by a bias detecting circuit and a comparator, a bias voltage is output from a bias output terminal to the external bus enabling it. When a driver and receiver receive a PHY-SLEEP command through the external bus, the bias voltage output from the bias output terminal to the external bus is turned off, disabling it.

U.S. Pat. No. 6,333,643 to Kurooka, et al. issued Dec. 25, 2001 entitled, "Hotplug tolerant 110 Circuit" discloses a hot-plug tolerant I/O circuit, which is incorporated in a first device, includes a voltage generator. In a hotplug mode, in which an input signal higher than the power supply voltage is applied from a second device to the first device while the power supply voltage is not applied to the first device, the voltage generator generates a control voltage from the input signal, and supplies it to a transistor in the hotplug tolerant I/O circuit.

U.S. Pat. No. 7,130,175 to Dietz et al. issued Oct. 31, 2006 entitled, "Monolithic integratable circuit arrangement for protection against a transient voltage" discloses protection of at least one or more terminals of an integrated circuit, such as a low- or high-side driver stage against transient or over-voltages by two pairs of diodes. A first pair of diodes includes a regular diode and a Zener-diode. A second pair of diodes also includes a regular diode and a Zener-diode. These diode pairs are looped into the respective circuit and cooperate with an n-channel MOSFET or a p-channel MOSFET to ostensibly provide over-voltage protection, particularly for transmitter/receiver circuits and databus systems such as in motor vehicles.

Despite these various approaches, the prior art neither teaches nor suggests effective apparatus or methods for effectively handling events, including more robust late-VG events, to prevent hotplug damage to a PHY chip or other such device. Accordingly, what is needed is an improved apparatus (and associated method of operation) with a response time fast enough to prevent hotplug damage to the serial port, yet at the same time robust enough to ground excessive voltage without becoming overstressed and failing, even in cases of shorts or near-shorts between outgoing power terminals and the signal pairs.

Such improved apparatus and methods would also ideally be substantially "automatic" (i.e., not require user intervention), and adaptable to a number of different form factors and applications.

SUMMARY OF THE INVENTION

The present invention satisfies the foregoing needs by providing, inter alia, improved apparatus and methods for transient protection (e.g., against hotplug damage to serial bus ports).

In accordance with a first aspect of the invention, an apparatus is disclosed. In one embodiment, the apparatus comprises: logic adapted to detect an amount of return voltage between at least one signal pair; logic adapted to compare the amount of return voltage to a preset voltage level, thus yielding a comparison value; and logic adapted to at least reduce power to an outgoing port based at least in part upon the comparison value.

In a second aspect of the invention, a method of operating a data device is disclosed. In one embodiment, the method comprises: detecting an amount of return voltage between at least one signal pair; comparing the amount of return voltage to a preset voltage level, thus yielding a comparison value; and at least attenuating the power to an outgoing port based at least in part upon the comparison value.

In a third aspect of the invention, an electrical system is disclosed. In one embodiment, the electrical system comprises: at least one port adapted to receive a bus connector; a circuit adapted to compare an amount of return voltage between a signal pair to a preset voltage level, thus yielding a comparison value; and a controller adapted to at least mitigate power to the port based at least in part upon the comparison value.

In a fourth aspect of the invention, an integrated circuit (IC) embodying at least portions of the aforementioned circuitry is disclosed.

In one variant, the integrated circuit (IC) comprises a substantially semiconductive die, the die comprising: first gate logic adapted to detect an amount of return voltage between at least one signal pair; second gate logic adapted to compare the amount of return voltage to a predetermined voltage level, thus yielding a comparison value; and third gate logic adapted to at least reduce power to at least a portion of an outgoing port based at least in part upon the comparison value.

The die may be selected for example from the group consisting of: (i) Silicon, (ii) Silicon Germanium, (iii) Gallium Arsenide, and (iv) complementary metal oxide (CMOS).

In another variant, the IC apparatus is adapted for use in a high-speed serialized bus protocol device such as e.g., an IEEE Std. 1394 ("Firewire") enabled device, or a Serializer-Deserializer (SERDES) application.

In another variant, the IC comprises a System-on-Chip (SoC) device having memory and a microprocessor or microcontroller core adapted to run logic for implementing the features and behavior of the transient protection circuit (including evaluation of conditions necessary for invocation of protection). In another embodiment, the circuit is integrated into a PHY integrated circuit of the type well known in the networking arts.

In a fifth aspect of the invention, an electronic device comprising the transient protection circuitry described herein is disclosed. In one embodiment, the device comprises a personal electronic device (e.g., personal media device, personal computer, etc.) having a data interface port adapted to mitigate transient damage.

In another variant, the device comprises a networked computer server.

In still another embodiment, the device comprises a media gateway (MG) or comparable network intermediary device.

In yet a further embodiment, the device comprises a plug-in card-like form factor.

BRIEF DESCRIPTION OF THE DRAWINGS

FIG. 3b is a logical flow diagram of an exemplary embodiment of a method of current control adapted to be rim concurrently with the method depicted in FIG. 3a.

FIG. 4 is a logical flow diagram illustrating one variant of the method depicted by FIG. 3a.

FIG. 5 is a logical flow diagram illustrating another variant of the method depicted by FIG. 3a.

DETAILED DESCRIPTION OF THE INVENTION

Reference is now made to the drawings wherein like numerals refer to like parts throughout.

As used herein, the terms "client device" and "end user device" include, but are not limited to, set-top boxes (e.g., DSTBs), personal computers (PCs), and minicomputers, whether desktop, laptop, or otherwise, and mobile devices such as handheld computers, PDAs, video cameras, personal media devices (PMDs), such as for example an Apple iPod™, or Motorola ROKR, LG "Chocolate", and smartphones such as the Apple iPhone™, or any combinations of the foregoing.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (BREW), and the like.

As used herein, the term "integrated circuit (IC)" refers to any type of device having any level of integration (including without limitation ULSI, VLSI, and LSI) and irrespective of process or base materials (including, without limitation Si, SiGe, CMOS and GaAs). ICs may include, for example, memory devices (e.g., DRAM, SRAM, DDRAM, EEPROM/Flash, ROM), digital processors, SoC devices, FPGAs, ASICs, ADCs, DACs, transceivers, memory controllers, and other devices, as well as any combinations thereof.

As used herein, the terms "memory" includes any type of integrated circuit or other storage device adapted for storing digital data including, without limitation, ROM. PROM, EEPROM, DRAM, SDRAM, DDR/2 SDRAM, EDO/FPMS, RLDRAM, SRAM, "flash" memory (e.g., NAND/NOR), and PSRAM.

As used herein, the terms "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, secure microprocessors, and application-specific integrated circuits (ASICs). Such digital processors may be contained on a single unitary IC die, or distributed across multiple components.

As used herein, the terms "network" and "bearer network" refer generally to any type of data, telecommunications or other network including, without limitation, data networks (including MANs, PANs, WANs, LANs, WLANs, internets, and intranets), hybrid fiber coax (HFC) networks, satellite networks, and telco networks. Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, WAP, SIP, UDP, FTP, RTP/RTCP, H.323, etc.).

As used herein, the term "network interface" refers to any signal, data, or software interface with a component, network or process including, without limitation, those of the Firewire FW400, FW800, etc.), USB (e.g., USB2), Ethernet (e.g., 10/100, 10/100/1000 (Gigabit Ethernet), 10-Gig-E, etc.), MoCA, Serial ATA (e.g., SATA, e-SATA, SATAII), Ultra-ATA/DMA, Coaxsys (e.g., TVnet™), radio frequency tuner (e.g., in-band or OOB, cable modem, etc.), WiFi (802,11a,b,g,n), WiMAX (802.16), PAN (802.15), or IrDA families.

As used herein, the term "SERDES" or serializer/deserializer refers to, without limitation, a process adapted for conversion of parallel data or signals to serial format, or serial data or signals to parallel. SERDES devices facilitate the transmission of parallel data between two points over serial streams, reducing the number of data paths, and hence the number of connecting terminals or wires required. Many SERDES devices are capable of full-duplex operation.

As used herein, the term "signal pair" refers generally to two conductors or buses used to pass data or signals. For example, a signal pair may comprise without limitation a transmit and receive signal pair within a port or bus transceiver.

As used herein, the term "wireless" means any wireless signal, data, communication, or other interface including without limitation Wi-Fi, Bluetooth, 3G, HSDPA/HSUPA, TDMA, CDMA (e.g., IS-95A, WCDMA, etc.), FHSS, DSSS, GSM, PAN/802.15, WiMAX (802.16), MWBA (802.20), narrowband/FDMA, OFDM, PCS/DCS, analog cellular, CDPD, satellite systems, millimeter wave or microwave systems, acoustic, and infrared (i.e., IrDA).

Overview

The present invention provides, inter alia, methods and apparatus for protecting a data bus port from experiencing transient damage such as may be incurred in a hotplug situation. Such data ports may be used for example as network or data interfaces and reside in, e.g., network or consumer electronic devices, client devices, personal computers, servers, and any number of myriad other applications. For instance, the present invention finds utility in protecting serial bus PHY devices (which may be rendered, for example, in the form of one or more integrated circuits), from being damaged due to an accumulation or creation of an excessive voltage between one or more signal pairs of that PHY.

In an exemplary embodiment of the present invention, a circuit is provided which detects a high return voltage on a signal pair (such as by comparing this voltage with a preset voltage level), and responds by reducing or turning off the outgoing port power. Additionally, a diode bleeds excess voltage on the signal pair to ground in order to prevent voltage from rising during the time necessary for the circuit to respond.

In one variant of the invention, an RC circuit is used to detect excessive voltage between a signal pair. The RC time constant can be adjusted to a comparatively short value (e.g., 10 microseconds), thus providing the circuit with a faster response time than prior art solutions.

In another variant, a Zener diode is used. The Zener diode provides more robust handling of higher transient voltages when the outgoing power is turned off, significantly decreasing the likelihood that the Zener will fail (even over a significant number of transient events). The Zener bias levels and comparator voltage levels within the circuit are adjusted so that the comparator voltage level needed to turn off the power is as low as practicable.

In some embodiments, an active current monitor/limiter is used to monitor outgoing current. In the case of shorts or near shorts, this limits the outgoing current, enabling the Zener to drain the incoming current without itself being over-stressed and potentially failing.

Other features and advantages of the present invention will immediately be recognized by persons of ordinary skill in the art with reference to the attached drawings and detailed description of exemplary embodiments as given below.

DETAILED DESCRIPTION OF EXEMPLARY EMBODIMENTS

Exemplary embodiments of the invention are now described in detail. It will be appreciated that while described primarily in the context of a serial bus port (e.g., IEEE-Std. 1394, USB, SERDES, or the like), the present invention is in no way limited to such applications or architectures.

Moreover, while described in the context of particular circuit components and configurations, it will be appreciated by those of ordinary skill that equivalent components and configurations may be substituted or used in concert with those described herein. Additionally, other types of functionality (e.g., signal processing, filtration, noise suppression, etc.) can be integrated or combined with the disclosed circuitry in order to expand its available capabilities or features.

Additionally, while described primarily in terms of wireline (i.e., cabled) embodiments, the teachings of the invention may be applied to devices which utilize wireless communications or data interfaces over at least a portion of their signal path(s).

Figure 1:
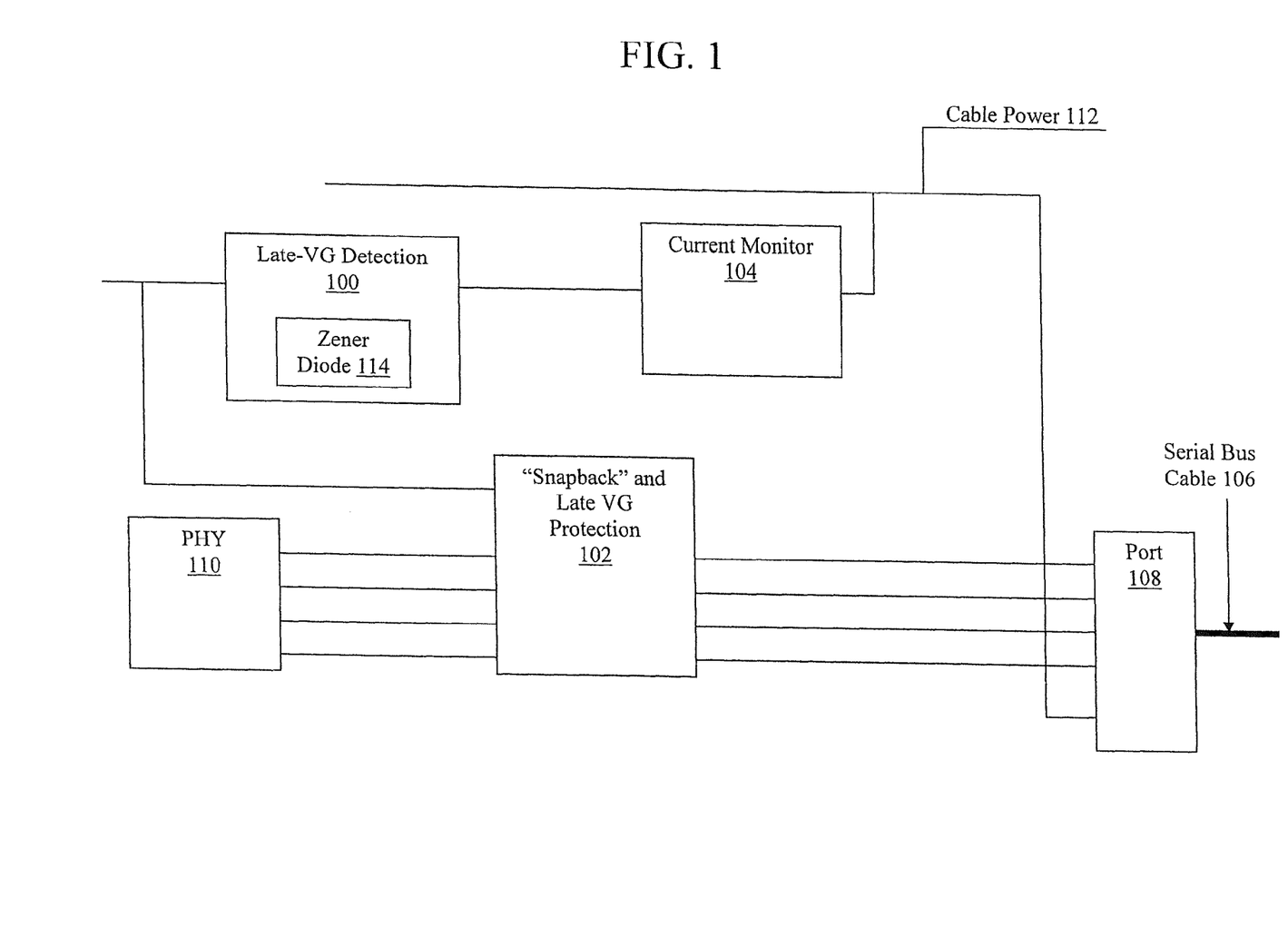
FIG. 1 is a functional block diagram providing a high-level illustration of one embodiment of the present invention.

FIG. 1 is a block diagram presenting a high level illustration of one embodiment of the apparatus of the present invention. Port 108 comprises a serial bus port adapted to interface with, e.g., a serial bus cable 106 of the type well known in the art. Outgoing power is supplied to the port 108 via a power source (indicated as the cable power 112 in FIG. 1). The port 108 receives signals transmitted over the serial bus cable 106 and transmits these signals to the PHY 110, which may comprise for example an integrated circuit, discrete logic, etc. Similarly, the port 108 receives signals from the PHY 110 and transmits these signals over the serial bus via the serial bus cable 106.

The active late-VG detection module 100 of the illustrated embodiment comprises logic for detecting voltage levels between one or more signal pairs associated with the port 108 during an intermitted connection, logic for comparing these voltages to a preset voltage level, and logic 102 for triggering the snapback and late-VG protection module 102 in case excess voltage between a signal pair is detected (as measured relative to the predetermined voltage level). When such excess voltage is detected, the snapback and late-VG protection module 102 shuts off the cable power 112 to the port 108, thus abating return power and thereby protecting the PHY device 110 from hotplug damage.

While the exemplary embodiment of FIG. 1 is described in the context of sensing voltages across a single signal pair, it will be appreciated that the detection or sending of voltage may be conducted according to other schemes, including for example sensing two or more pairs, and using the highest (more conservative) value to drive the circuit logic, using a coincidence-type logic (e.g., 1-of-2, 2-of-3, etc.), using an averaging circuit or integrator, etc, Moreover, the sensing or detection need not be continuous in nature, but feasibly can be implemented on a periodic or sampling basis, although such approach may expose windows of vulnerability.

Moreover, while described in the context of completely turning off power to the port, it will be appreciated that the power may merely be reduced rather than completely turned off (e.g., to a level sufficiently low as to mitigate the transient or any damage to the port components or PHY). This approach may advantageously reduce the cycle or recovery time of the port. The reduction of power may also be scaled according to the severity of the voltage transient/differential sensed by the circuit; i.e., a lower reduction of power for a smaller detected excess voltage. A stepped or other reduction profile may also be utilized, in effect implementing a looped control logic, such as where for example the power is reduced by a first amount during a first increment, the excess voltage again sampled, with a second and subsequent reductions being driven by the sampled value(s) of the excess voltage. Any number of such variable control schemes will be appreciated by those of ordinary skill given the present disclosure.

Moreover, only portions of the port can be selectively affected by the power reduction/termination. For example, if the port comprises two or more signal pairs, each pair can be individually monitored and power selectively terminated or reduced only to those pairs affected by the transient.

In some variants, the active late-VG detection module 100 further comprises at least one Zener diode 114 adapted to bleed excess voltage to ground while the circuit is responding (without it the voltage on the signal pair may continue to rise). Zener diodes advantageously allow for such bleeding of voltage by way of a controlled "avalanche" at the breakdown or Zener voltage. Zener diode construction and implementation is well known in the electronic arts, and accordingly not described further herein. In an exemplary variant, a 3.6V Zener diode is used to provide a high degree of robustness against higher transient voltages that the Zener diode may experience while the outgoing power is being turned off. However, it will be recognized that other voltage ratings, and in fact other types of mechanisms for maintaining a desired voltage across the diode in the reverse bias direction, may be used consistent with the invention.

The outgoing current monitor 104 comprises additional logic for monitoring and limiting outgoing current. In the case of shorts (effectively unlimited instantaneous current) or near-shorts (very high transient currents), limiting the current in this manner enables the Zener to drain incoming current without itself becoming overly stressed or failing. Note that in many cases, bleeding excessive voltage to ground by means of a Zener diode, coupled with cutting off or reducing outgoing power to the port 108, will protect the PHY (chip) 110 from hotplug damage in cases where the current is too low to trip the current limiter (for example, in low-current, late-VG events).

Figure 2A:
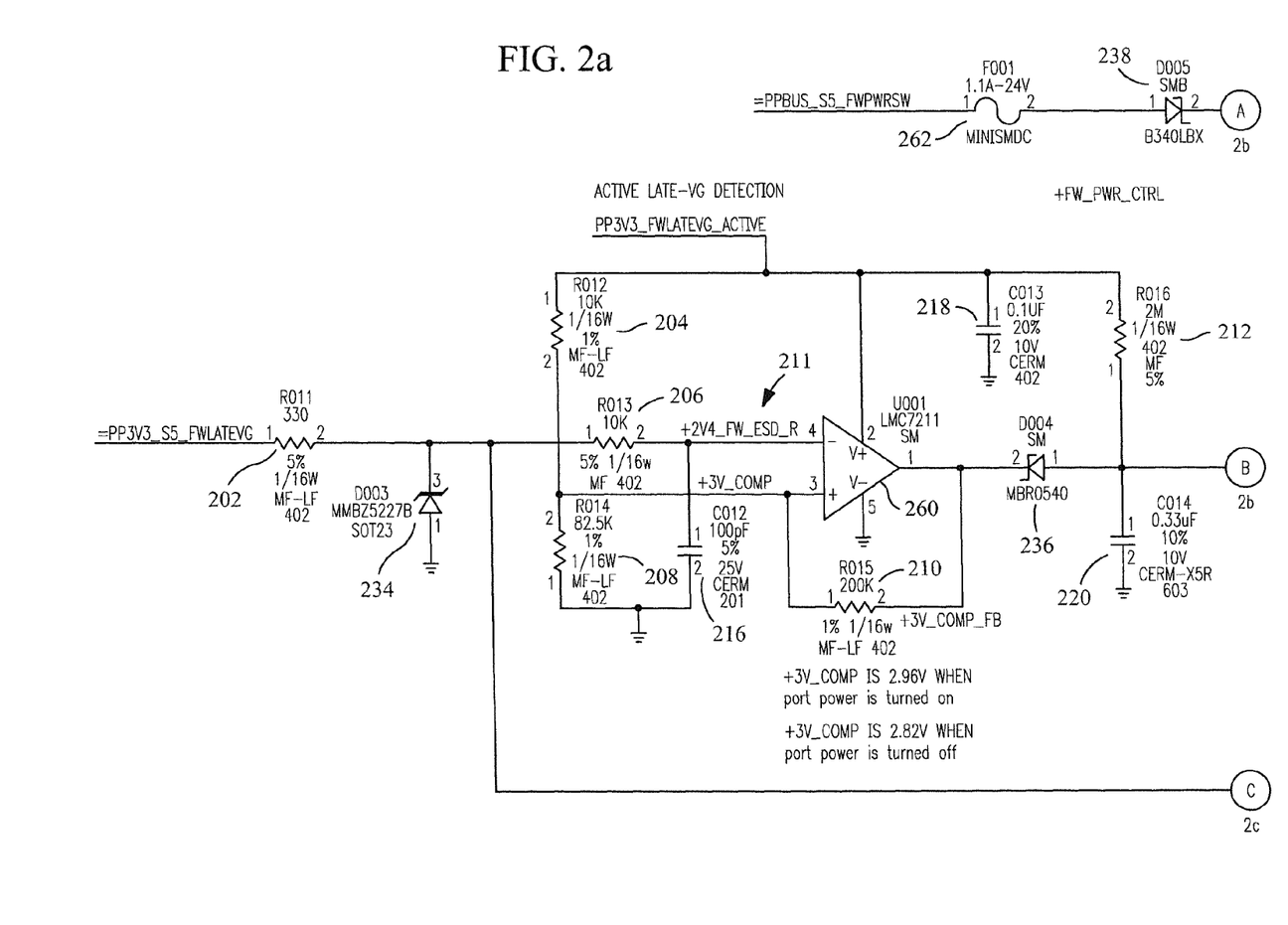
FIG. 2a-2c are schematic circuit diagrams of one embodiment of the transient protection circuitry of the present invention.
Figure 2B:
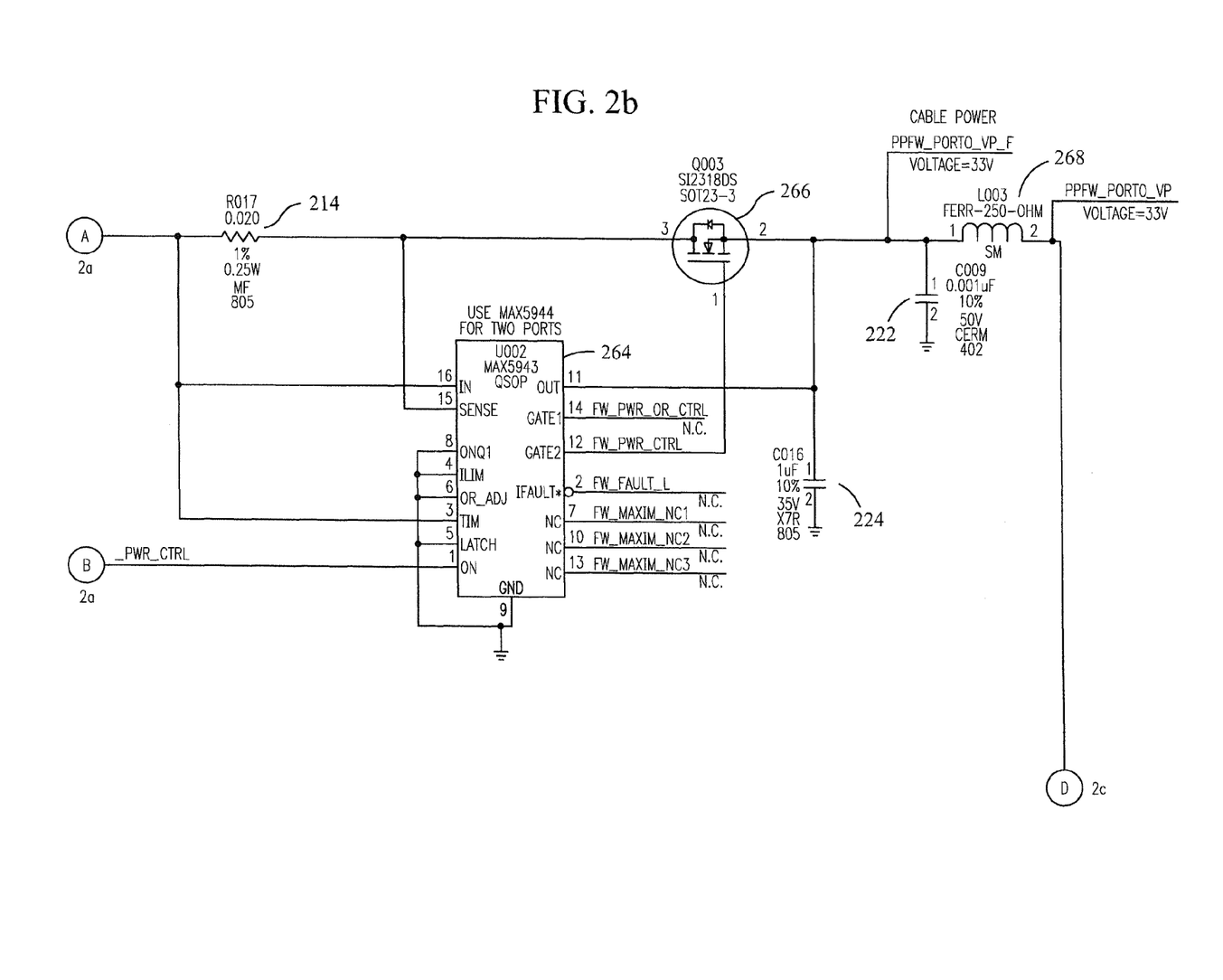
Figure 2C:
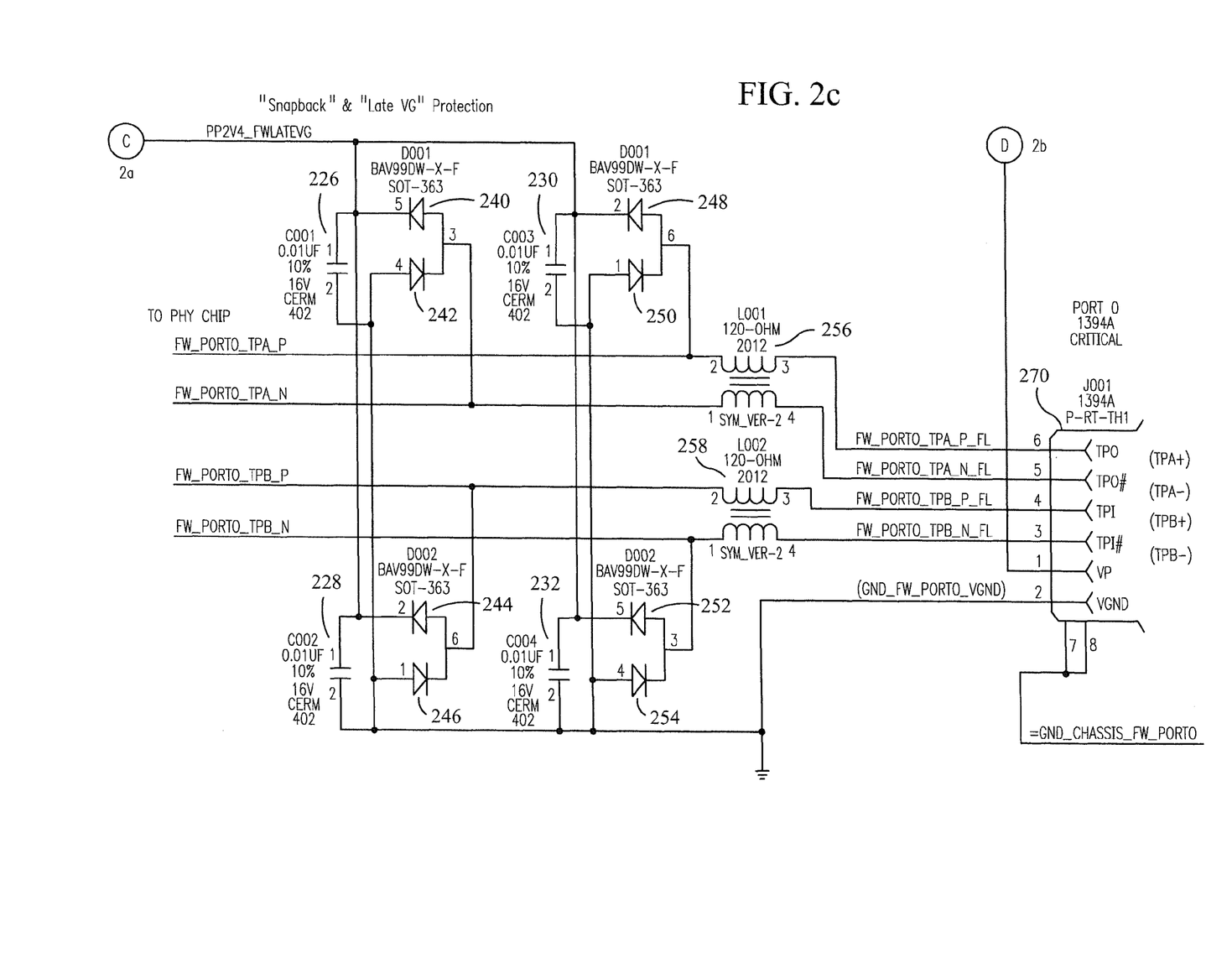

FIGS. 2a-2c are block diagrams presenting a low (component) level schematic illustration of an exemplary embodiment of the present invention, with each figure representing a separate portion of the same circuit. The circuit depicted by FIGS. 2a-2c is implemented by a series of resistors 202-214, capacitors 216-232, diodes 234-254, inductors 256-258, a comparator 260, a terminal device 262, a controller 264, a MOSFET 266, an inductive coil 268, and a serial bus port 270. Note, however, that this embodiment is mainly illustrative; the scope of the present invention also contemplates a large variety of alternate implementations using different components, component quantities, and/or component arrangements which will be recognized by those of ordinary skill in the electronic art for accomplishing the functionality described herein.

The general principles of the embodiment illustrated in FIG. 1 are also applicable to the embodiment shown in FIGS. 2a-2c—i.e., a voltage level is detected between a signal pair, compared against a predetermined voltage level, and if the voltage level between the signal pair exceeds the predetermined voltage level, excess voltage is bled to ground while outgoing power to the port is shut off.

It will be appreciated that while the exemplary embodiment utilizes a fixed or predetermined voltage level for purposes of comparison, this level may be made variable as a function of time, operating mode, etc. or even deterministic (i.e. a function of other sensed and/or predetermined variables or values). In this fashion, the protection afforded by the circuit can be dynamically variable as a function of operating conditions, etc as desired.

Additionally, certain salient features of the illustrated embodiment are also now described in greater detail.

First, the embodiment shown in FIGS. 2a-2c utilizes an RC circuit to detect the voltage levels across the signal pair. The exemplary configuration of the RC circuit comprises a single resistor 206 (here, 10 kOhm) and a capacitor 216 (100 pf). A circuit response time is achieved by adjusting the RC time constant of the RC circuit to approximately ten microseconds, although it will be appreciated that other values (greater or lesser) may be used depending on the desired attributes and particular application. Moreover, more complex behavior (e.g., graded or stepped response time as a function of current, etc.) can be employed if desired.

Second, the circuit utilizes a Zener diode 234. The Zener diode 234 (rated at 3.6V in this embodiment) is needed in order to attenuate the voltage levels during the time that the circuit is responding—without it, the voltage levels on the signal pair can still rise to an excessive (damaging) level while the circuit is in the process of responding.

Third, the Zener bias levels (of the Zener diode 234) and the comparator voltage levels (of the comparator 260) are adjusted such that the comparator output voltage level needed to turn off power is as low as practicable (set at 296V in this embodiment) while the comparator voltage level when hysteresis is applied is always higher than the electrostatic discharge (ESD) "rail" 211 when there is no excessive voltage on the signal pairs (i.e., set at 2.82V, with the ESD rail at a nominal 2.4V-2.7V depending on the individual Zener performance and tolerances).

Fourth, a controller 264 (in this embodiment, and active current monitor/limiter) is used to monitor outgoing current. In the case of shorts or near-shorts, this device limits the outgoing current, enabling the Zener diode 234 to drain the incoming current without itself being over-stressed. The exemplary Maxim MAX5943 integrated circuit device with an external current sense resistor is used for this purpose, but alternatively a MAX5944 device can be used to protect two ports using one chip. It will be appreciated by those of ordinary skill that yet other devices and configurations can be used for this purpose.

Figure 3A:
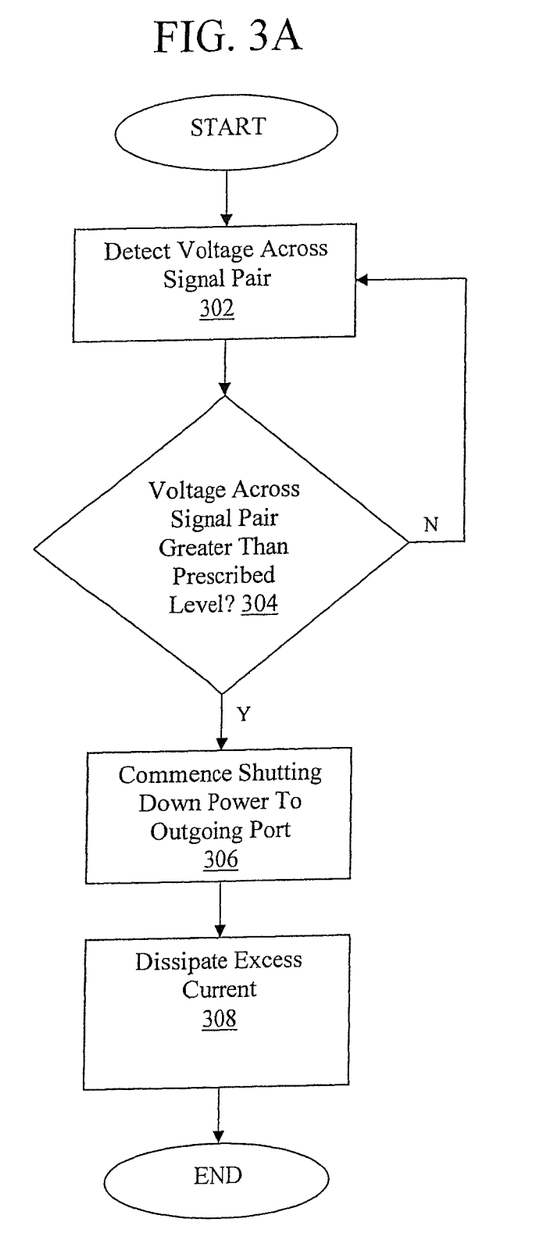
FIG. 3a is a logical flow diagram of a method of transient protection according to one embodiment of the present invention.
Figure 3B:
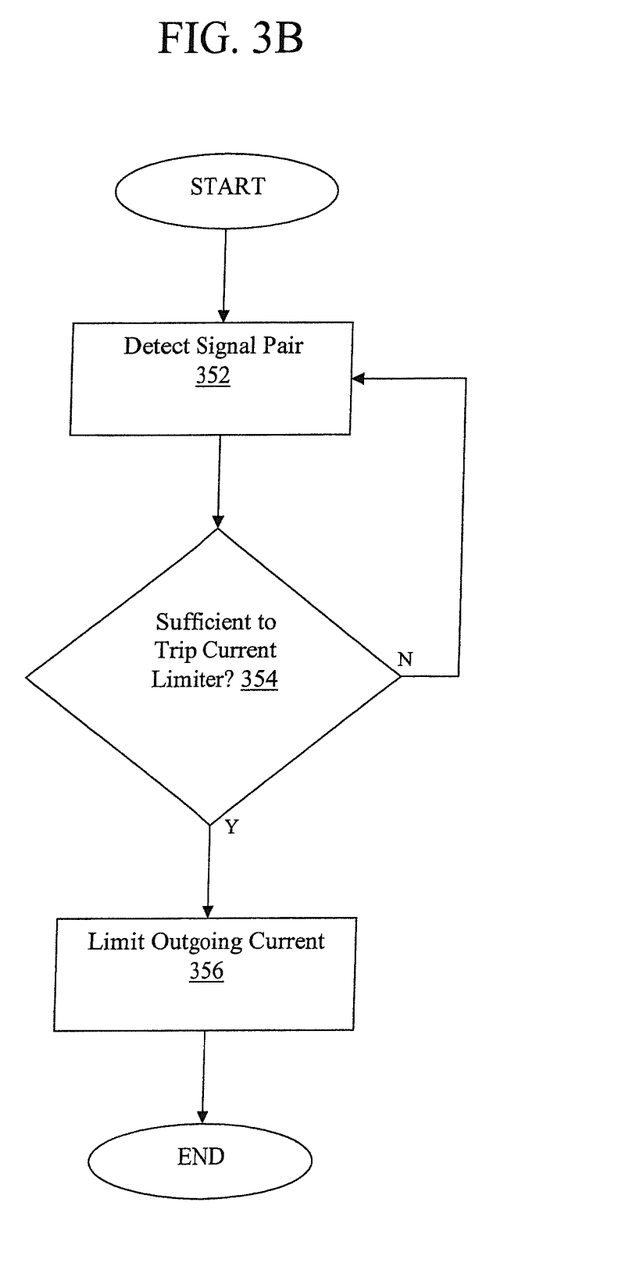

FIGS. 3a and 3b are flow diagrams illustrating one embodiment of the method of protecting a device (e.g., serial bus port) from transient damage according to the present invention. Note that even though these Figures each depict separate sequences of steps, in many embodiments the sequences are adapted to run concurrently or in parallel within the same circuit.

Referring now to FIG. 3a, the voltage level is first detected across one or more signal pairs per step 302. The detected voltage is then compared against a predetermined voltage level at step 304. As previously noted, while the exemplary embodiment utilizes a fixed or predetermined voltage level for purposes of comparison, this level may be made variable as a function of time, operating mode, presence or lack of transient conditions, etc. or even deterministic. According to one variant, the predetermined or threshold voltage level is set at 2.96V. In this manner, voltage that is greater than this threshold voltage level is deemed to be an "excess" voltage, although other values may clearly be used.

If no such excess voltage is detected, the process repeats from step 302 (this may be a continuous sampling/detection process, as previously noted). However, if excess voltage is detected, the circuit commences reduction or shutting off power to the outgoing port at step 306. While awaiting the power to be adjusted/terminated, excess current is bled to ground per step 308. In one embodiment, this is accomplished by means of the 3.6V Zener diode previously described. This approach is used because the Zener can handle higher transient voltages with a smaller chance of failure than other types of diodes, although it will be recognized that other types of devices may be used if desired.

Referring now to FIG. 3b, the generalized method of current protection is described. As shown, the voltage level is first detected across the signal pair(s) at step 352. Note that even though the logic for detecting voltage across the signal pair in step 352 is depicted (FIGS. 2a-2e) as being independent from the logic for detecting voltage across the signal pair in step 302, the scope of the present invention also includes those embodiments utilizing common logic. As can be seen in step 354, the detection process of step 352 continues until there is sufficient voltage (and hence current) to activate the current limiter function. When the current limiter is tripped, the current is limited per step 356. As previously noted, the exemplary embodiment of the circuit uses a Maxim MAX5943 IC with an external current sense resistor is used for this purpose. However, if multiple ports require protection, a MAX5944 or comparable IC may be substituted for the MAX5943 device, or two 5943 devices used in parallel.

Figure 4:
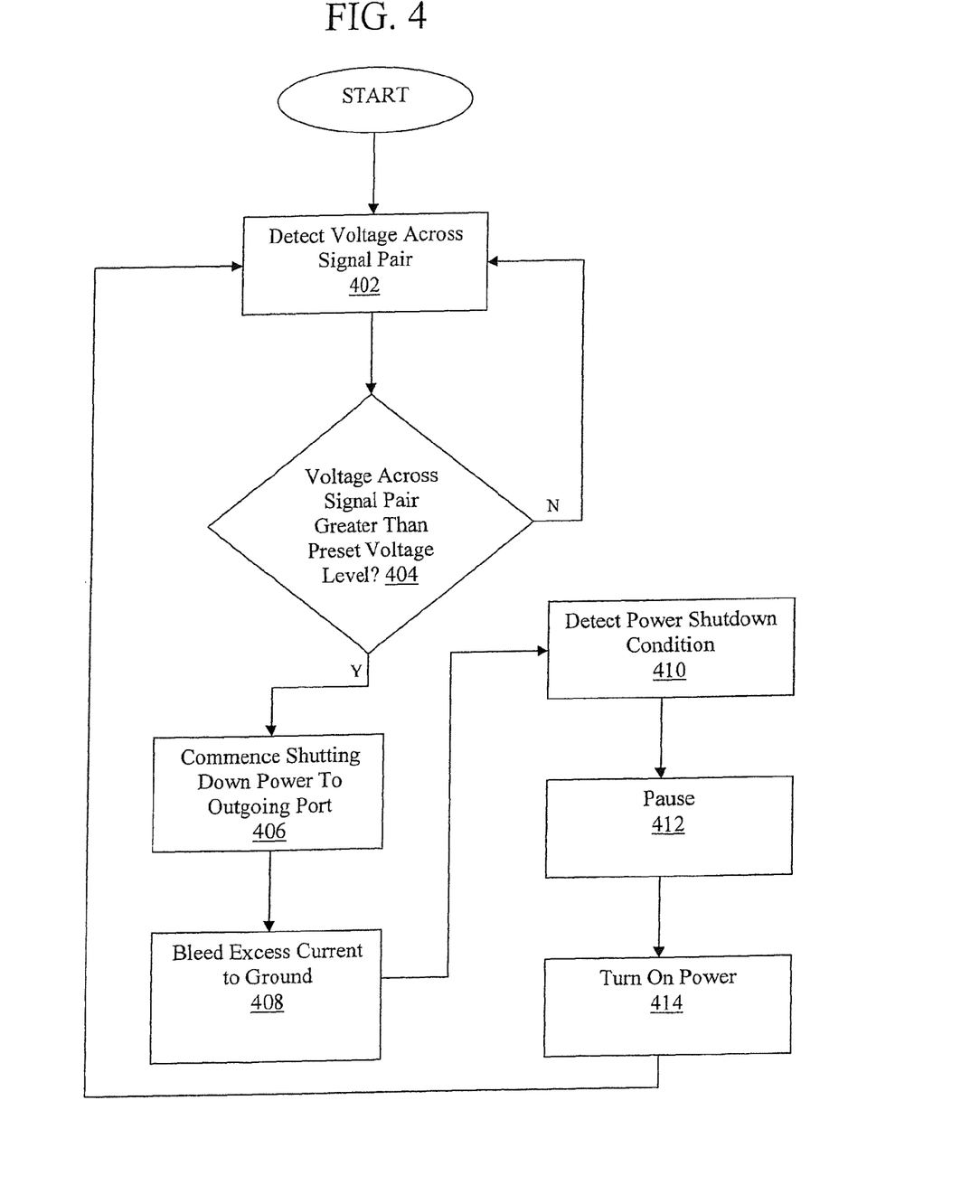

FIG. 4 is a flow diagram illustrating another variant of the embodiment of FIG. 3a. Steps 402-408 of FIG. 4 correspond generally to steps 302-308 from FIG. 3a. Steps 410-414 are also included for restoring power to the outgoing port after the power has been sufficiently reduced or turned off Note that the methodology depicted in FIG. 4 uses the lapse of a specified period of time as the trigger for restoring power to the outgoing port, although other criteria may be used (e.g., reduction of the excess voltage below the predetermined value or a second, lower "floor" or recovery voltage value, as in FIG. 5 described below; reduction of sensed current, etc.), or even combinations of the foregoing. Moreover, the aforementioned period of time may be made variable or deterministic; i.e., based on some parameter such as the magnitude of the sensed voltage excess (knowing that larger transients will typically take longer to recover from), magnitude of a sensed transient current, and so forth.

Additionally, the restoration of power may be scaled, or conducted according to a profile (including optionally periodically sampling of the excess voltage or current) if desired, analogous to that previously described with respect to reduction or termination of power.

Steps 402-408 generally proceed as steps 302-308 already described with respect to FIG. 3a. Once the power has been reduced or shut off, this condition is detected at step 410. The circuit then pauses for a specified period of time at step 412. This delay period may be set in a variety of ways, as previously noted. However, in accordance with a first embodiment, the delay period is simply adjusted so that the circuit restores power within a one-half (0.5) second from the time that power has been terminated (as measured e.g., between the initiation of the event or signal to terminate power, and that used to restore power, or alternatively between actual sensed values of the applied voltage as it is reduced and restored). At step 414, power is restored, and the process then repeats per step 402.

Figure 5:
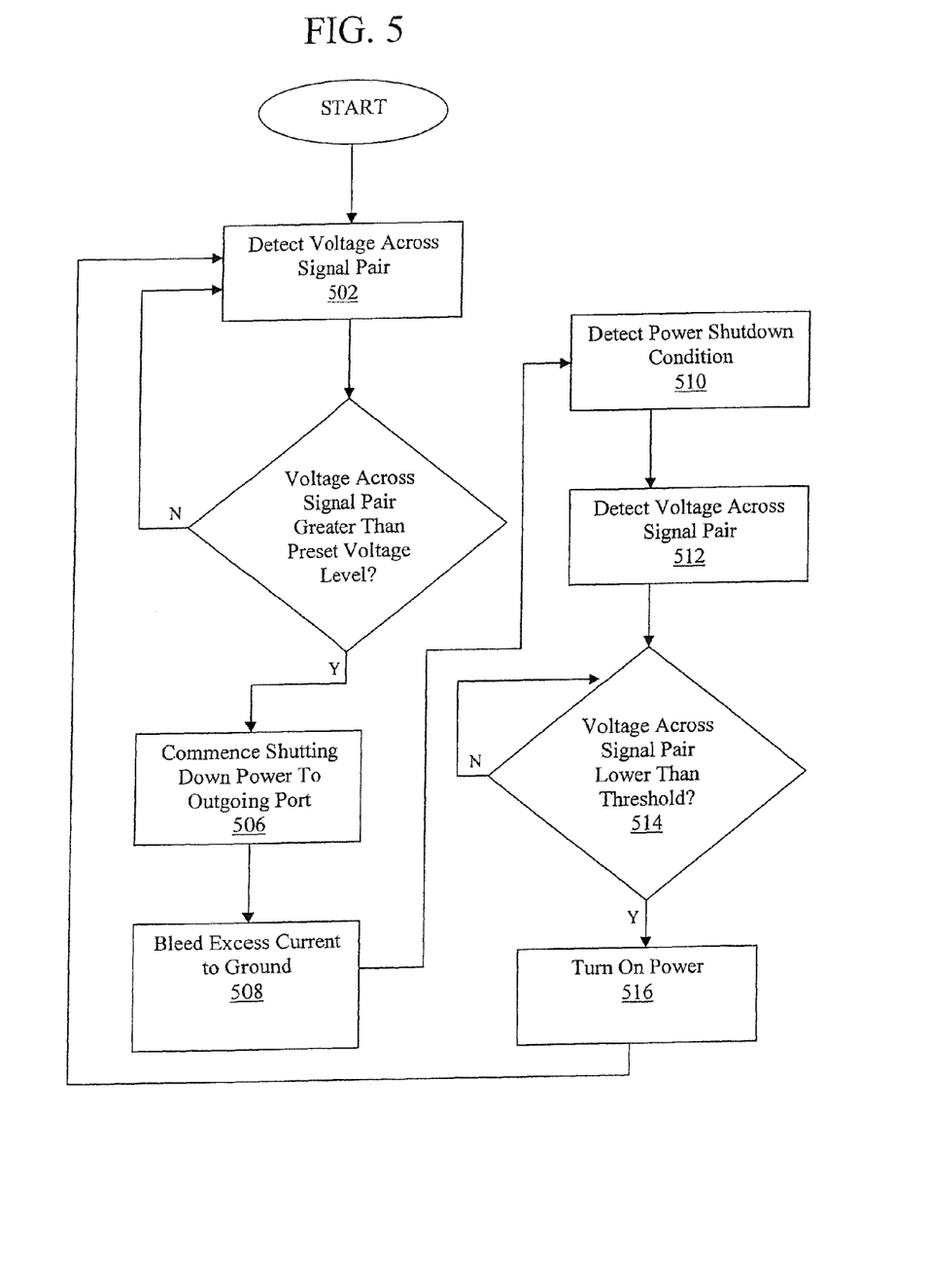

FIG. 5 is a flow diagram illustrating another variant of the methodology depicted in FIG. 3a. Steps 502-508 of FIG. 5 correspond generally to steps 302-308 from FIG. 3a. Steps 510-516 are also included for restoring power to the outgoing port after the power has been reduced or turned off. Note that the embodiment depicted in FIG. 5 uses a voltage threshold as the trigger for restoring power to the outgoing port.

Steps 502-508 generally proceed as steps 302-308 already described with respect to FIG. 3. Once the power has been shut off, this condition is detected at step 510. At step 512, voltage across the signal pair is again read. In one configuration, the logic that detects the voltage across the signal pair in step 512 comprises the same logic that detects the voltage across the signal pair in step 502.

As stated above, a certain voltage threshold is used as the trigger for restoring the power to the outgoing port. This threshold can be set to be the same level as the preset voltage level (for example, 2.96V) or alternatively, it may be set lower so as to help assure that undue cycling of the circuitry does not occur. Once the voltage across the signal pair has decreased below the threshold at step 514, the power is restored at step 516. The process then repeats at step 502.

Integrated Circuit and Alternate Embodiments

While the foregoing circuitry described with respect to FIGS. 1-5 comprises substantially discrete components (e.g., discrete resistors, capacitors, comparators, etc.), it will be appreciated that some or all of the functionality of the circuit can be combined into an integrated circuit of a desired level of integration (e.g., VLSI, ULSI, SoC), which may be application-specific (ASIC) or otherwise. Alternatively, the circuit disclosed herein may be rendered entirely from discrete components if desired.

The circuitry (whether in discrete or integrated form) may also be incorporated within other components, such as for example within a portion of the aforementioned PHY IC device, within or associated with a modular jack or connector (e.g., RJ45, including so-called 802.3 of "PoE" or Power-over-Ethernet devices), SERIES transceiver, plug-in cards or similar form factors, and so forth. The detection, reduction/shutdown, and restart logic previously described may also be controlled at least in part using a digital processor or microcontroller, which may also be integrated with the PHY, SoC, etc. previously described. To this end, the processor, microcontroller, etc. can utilize a software or firmware routine stored in memory (e.g., a program memory on the IC) in order to implement the logic of the circuitry.

Logging functions may also be implemented in this fashion; e.g., such as wherein the microcontroller or processor logs transient protection events including optionally one or more parameters sensed during the transient (and recovery) such as excess voltage, current, duration, etc. This logged data can be subsequently extracted or read out of the storage device (e.g., via a network interface), thereby allowing for remote diagnosis of network transient occurrences.

Myriad other applications and configurations of the circuit of the present invention will be readily apparent to those of ordinary skill when provided the present disclosure.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. An apparatus including an outgoing port, the apparatus comprising:
   a first logic adapted to detect an amount of return voltage within at least one signal pair;
   a second logic adapted to evaluate the amount of return voltage with respect to a criterion, thus yielding an evaluation value; and
   a third logic adapted to at least reduce power to at least a portion of the outgoing port based at least in part upon the evaluation value, the evaluation value determining a reduction profile and a restoring profile that cooperate to reduce a recovery time of the outgoing port after the power reduction, wherein the third logic is adapted to restore power to the at least one portion of the outgoing port according to the restoring profile.

2. The apparatus of claim 1, wherein the criterion comprises a predetermined voltage level.

3. The apparatus of claim 2, wherein the first logic comprises a resistor-capacitor (RC) circuit.

4. The apparatus of claim 3, wherein the RC circuit comprises components producing an RC time-constant of approximately ten (10) microseconds.

5. The apparatus of claim 2, further comprising a Zener diode apparatus adapted to shunt at least a portion of an excess voltage to ground, wherein the excess voltage comprises a voltage between the at least one signal pair that is greater in magnitude than said predetermined voltage level.

6. The apparatus of claim 5, wherein the second logic comprises at least one comparator integrated circuit.

7. The apparatus of claim 6, further comprising an electrostatic discharge (ESD) rail adapted to ground at least a portion of an electrostatic discharge.

8. The apparatus of claim 7, said apparatus configured such that when a hysteresis is applied thereto, said at least one comparator circuit comprises a voltage level greater than a voltage level of the ESD rail when there is no said excess voltage between the at least one signal pair.

9. The apparatus of claim 7, said apparatus configured such that when a hysteresis is applied thereto, said at least one comparator circuit comprises a voltage level of approximately 2.8 volts and the ESD rail comprises a voltage level of approximately 2.5 volts when there is no said excess voltage between the at least one signal pair.

10. The apparatus of claim 2, wherein the predetermined voltage level comprises a voltage level of approximately 2.96 volts.

11. The apparatus of claim 5, wherein the Zener Diode comprises a 3.6 volt Zener Diode.

12. The apparatus of claim 5, further comprising a logic configured to monitor and limit outgoing current.

13. The apparatus of claim 12, wherein the logic configured to monitor and limit outgoing current comprises an integrated circuit device and an external current sense resistor.

14. The apparatus of claim 1, wherein said port comprises a data port compliant with an IEEE-Std. 1394.

15. An electrical system, comprising:
at least one port adapted to receive a serial bus connector;
a circuit adapted to compare an amount of return voltage between a signal pair to a present voltage level, thus yielding a comparison value; and
a controller adapted to shut off power to the port based at least in part upon the comparison value, the comparison value determining a reduction profile and a restoring profile that cooperate to reduce a recovery time after the power shut off; wherein
the controller is adapted to restore power to the at least one portion of the outgoing port according to the restoring profile.

16. The electrical system of claim 15, wherein the circuit comprises a resistor-capacitor (RC) circuit.

17. The electrical system of claim 16, wherein the RC circuit comprises an RC time constant of approximately ten (10) microseconds.

18. The electrical system of claim 15, further comprising a Zener diode adapted to bleed an excess voltage to ground, wherein the excess voltage comprises a voltage between the signal pair that is greater than the preset voltage level.

19. The electrical system of claim 18, wherein the circuit comprises a comparator.

20. The electrical system of claim 19, further comprising an electrostatic discharge (ESD) rail adapted to ground electrostatic discharge.

21. The electrical system of claim 20, said electrical system configured such that when hysteresis is applied, the comparator comprises a voltage level greater than a voltage level of the ESD rail when there is no said excess voltage between the signal pair.

22. The electrical system of claim 20, said electrical system configured such that when a hysteresis is applied, the comparator comprises a voltage level of 2.82 volts and the ESD rail comprises a voltage of 2.4-2.7 volts when there is no said excess voltage between the signal pair.

23. The electrical system of claim 18, wherein the Zener Diode comprises a 3.6 volt Zener Diode.

24. The electrical system of claim 15, wherein the preset voltage level comprises a voltage level of approximately 2.96 volts.

25. The electrical system of claim 15, further comprising logic configured to monitor and limit outgoing current to said at least one port.

26. The electrical system of claim 25, wherein the logic configured to monitor and limit outgoing current comprises an integrated circuit and an external current sense resistor.

27. An integrated circuit (IC) apparatus, comprising a substantially semiconductive die, said die comprising:
a first gate logic adapted to detect an amount of return voltage between at least one signal pair;
a second gate logic adapted to compare the amount of return voltage to a predetermined voltage level, thus yielding a comparison value; and
a third gate logic adapted to at least reduce power to at least a portion of an outgoing port based at least in part upon the comparison value, the comparison value determining a reduction profile and a restoring profile that cooperate to reduce a recovery time of the outgoing port after the power reduction, wherein
the third gate logic is adapted to restore power to the at least one portion of the outgoing port according to the restoring profile.

28. The IC apparatus of claim 27, wherein said substantially semiconductive die comprises a die selected from the group consisting of: (i) Silicon, (ii) Silicon Germanium, (iii) Gallium Arsenide, and (iv) complementary metal oxide (CMOS).

29. The IC apparatus of claim 28, wherein said IC apparatus is adapted for use in high-speed serialized bus protocol device.

30. The IC apparatus of claim 29, wherein said high-speed serialized bus protocol device comprises a multimedia device configured to operate in accordance with an IEEE Std. 1394 ("Firewire") protocol.

31. The IC apparatus of claim 28, wherein said IC apparatus is configured for use in a Serializer-Deserializer (SERDES) application.

* * * * *